106-18.35 SR
C222A XR 2,457,805

Patented Jan. 4, 1949 2,457,805

UNITED STATES PATENT OFFICE 2,457,805

ALIPHATIC ESTERS OF 2,4,5-TRICHLOROPHENOL

Arthur R. Cade, Rutherford, and William S. Gump, Upper Montclair, N. J., assignors to Burton T. Bush, Inc., New York, N. Y., a corporation of New Jersey No Drawing. Application November 2, 1946, Serial No. 707,520

4 Claims. (Cl. 260—479)

1

This invention relates to new chemical substances, and more especially to esters of 2,4,5-trichlorophenol and aliphatic acids having not more than 12 carbon atoms.

The novel esters may be obtained by reacting 2,4,5-trichlorophenol and a suitable acid anhydride or acid chloride in the presence of an inert solvent such as benzene or toluene, the desired ester being then isolated by distillation or crystallization.

In general, the novel esters are colorless crystalline solids. Some, however, are liquids. They are soluble in many common organic solvents, such as acetone, ethyl acetate, toluene and naphtha, but are only slightly soluble in ethyl alcohol, and insoluble in water.

Our esters possess the very unexpected property of being effective fungicides when used for the protection of wool and leather against the attack of fungi of the species Pencillium and Aspergillus, and for the treatment of cottonseed against infection by *C. gossypii.*

That the foregoing named property was quite unexpected may be seen from a consideration of the following. It has long been known that cottonseeds, like the majority of seeds, carry spores of certain fungi. After planting the seeds, these spores often germinate, thereby rendering the plant subject to attack by the resulting fungous growth and often terminating in the death of the plant. Sometimes, the plant does not live to break through the ground. Be this as it may, the inevitable result is that there is a large economic loss to the nation, in the form of poor yields of cotton per acre of seed planted.

Naturally, such a condition attracted efforts to ameliorate it. As a result, several methods have already been devised to disinfect seeds. A number of disinfectants have been suggested, fumigation has been resorted to, and various solutions have been applied to seeds in order to reduce losses. Many of the methods are open to serious objection, as some of the materials employed actually attack the seed itself and incorrect application of the material may cause reduction in germination.

Moreover, many of the most successful compounds are those involving the use of mercury salts. As is well known, these compounds are poisonous. All too often there are reports that animals have become poisoned as a result of eating treated cottonseed which has not been planted. Furthermore, mercury preparations are

2 subject to transmit restrictions, making another reason for desiring non-mercury fungicides.

One of the non-mercury fungicides hitherto developed is 2,4,5-trichlorophenol. A substantial part of its fungicidal activity has been attributed to the phenolic hydroxyl group it contains. The disadvantages of the 2,4,5-trichlorophenol are that it is irritating and it has a rather strong, characteristic odor which is not regarded as being an agreeable one.

The novel esters herein do not possess the disadvantages of the free phenol. They do possess considerable fungicidal activity. This is very surprising in view of the fact that the hydroxyl group of the 2,4,5-trichlorophenol has been blocked and does not exist in the esters.

In order more fully to clarify this invention the following examples are given by way of illustration.

Example I

*Formate of 2,4,5-trichlorophenol*

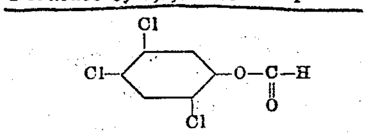

172 grams of acetic anhydride were cooled to 15° C. and under stirring 40 grams of formic acid were added at such a rate that the temperature did not exceed 20° C. A solution of 140 grams of 2,4,5-trichlorophenol in 35 grams of formic acid had been prepared by heating and the paste obtained on cooling of the solution was added slowly to the acetic anhydride-formic acid mixture during one hour. The clear reaction mixture was allowed to stand at room temperature (about 25° C.) for five days. After that period, crystals had formed which were filtered off, washed with 50% aqueous formic acid, and water, and dried in vacuo. 82 grams of 2,4,5-trichlorophenyl formate, as white needles, melting at 72° C.-73° C., were obtained.

The 2,4,5-trichlorophenyl formate exhibited fungicidal properties when tested on wool and leather against Aspergillus and Penicillium spores. Two methods of test were employed: the zone of inhibition test and the moist chamber method.

In the first test, the wool and leather were soaked in a 2% alcoholic solution of the formate. The alcohol was evaporated by air-drying. The culture medium used for this test was prepared according to the formula given in Specification No. T 1212A, of the U. S. Army Corps of Engineers, and consisted of:

| | Grams |
|---|---|
| $NaNO_3$ | 3.0 |
| $K_2HPO_4$ | 1.0 |
| $MgSO_4$ | 0.5 |
| $FeSO_4 \cdot 7H_2O$ | 0.01 |
| Sucrose | 30.00 |
| Agar | 15.00 |
| Water, to make volume of 1000 cc. | |

Petri dishes were prepared containing 15 cc. of the medium. Some dishes were inocculated with Aspergillus spores and some with Penicillium spores, by swabbing the surface of the agar solution with a water suspension of the organisms.

The treated wool and leather samples, as well as untreated samples, were placed on top of the agar, and the plates were incubated in an atmosphere of saturated water vapor at 28° C. to 30° C. for a period of 12 to 14 days. The dishes were observed for the presence of any clear zone around the sample and also for the presence of any fungi growing on the surface of the samples.

It was found that the treated samples were free of fungi and were surrounded by a clear zone; whereas, the untreated samples had numerous fungi thereon and no zone of inhibition around the samples.

The other test involved preparing samples of wool and leather as before and then hanging them vertically in a closed moist chamber for a month. The treated samples were found free of fungi but the untreated samples had been attacked severely by the fungi.

The formate was tested on cottonseed and found to give protection against *C. gossypii*. Cottonseed treated with the formate gives high yields of cotton.

EXAMPLE II

*Acetate of 2,4,5-trichlorophenol*

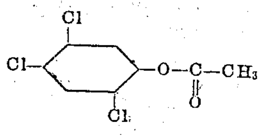

2,4,5-trichlorophenol (100 grams), 100 cc. of acetic anhydride and 10 grams of anhydrous sodium acetate were refluxed for 2 hours. The mixture was poured onto 250 grams of ice and allowed to stand for 2 hours. The solid was filtered and washed with water. The wet solid was crystallized from 220 cc. of methanol. 106 grams of 2,4,5-trichlorophenyl acetate, white needles, melting point 67° C.–68° C., were obtained.

The acetate, when tested as the formate was tested in accordance with Example I, also exhibited fungicidal properties.

EXAMPLE III

*Propionate of 2,4,5-trichlorophenol*

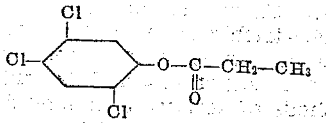

100 grams of 2,4,5-trichlorophenol were refluxed for 6 hours with 200 grams of propionic anhydride. After cooling, the mixture was poured on ice and allowed to stand over night. The oil was extracted with benzene; the benzene solution washed with water, then sodium bicarbonate solution, and again with water, and dried with anhydrous sodium sulfate. After removal of the benzene, the residual oil was distilled at a pressure of 5 mm. of mercury. 50 grams, boiling at 53° C.–110° C. were discarded; the second fraction (75 grams), boiling point 110° C.–135° C. was redistilled and 66 grams of the propionate, boiling point 123° C.–130° C. were obtained. The liquid, $d_{25}^{25}=1.3902$, $n_D^{20}=1.5418$, congealed after a few days' standing to a solid, C. P. 38° C.

The propionate, when tested as the formate was tested in accordance with Example I, also exhibited fungicidal properties.

EXAMPLE IV

*n-Caproate of 2,4,5-trichlorophenol*

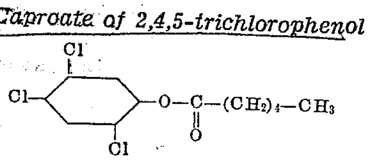

2,4,5-trichlorophenol (90 grams) was dissolved in 300 cc. of benzene under heating and stirring; 70 grams of n-caproyl chloride were dropped in during 2 hours and the mixture refluxed for 6 hours. After cooling, 200 cc. more of benzene were added and the benzene solution twice washed with water and dried with anhydrous sodium sulfate. A small amount of isopropanol had been added to clear the solution. The solvent was removed by distillation and the residual oil distilled at a pressure of 4 mm. of mercury. 107 grams of 2,4,5-trichlorophenyl-n-caproate were obtained. The liquid, $d_{25}^{25}=1.2691$, $n_D^{20}=1.5250$, boiled at 166° C. at 4 mm. of mercury.

The n-caproate, when tested as the formate was tested in accordance with Example I, also exhibited fungicidal properties.

EXAMPLE V

*Iso-caproate of 2,4,5-trichlorophenol*

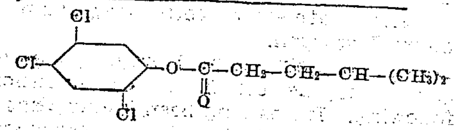

The 2,4,5-trichlorophenyl-isocaproate was obtained in a similar manner as the n-caproate, using iso-caproylchloride. The iso-caproate is a liquid, boiling point 170° C.–172° C., $d_{25}^{25}=1.2740$, $n_D^{20}=1.5266$.

The iso-caproate, when tested as the formate was tested in accordance with Example I, also exhibited fungicidal properties.

EXAMPLE VI

*Laurate of 2,4,5-trichlorophenol*

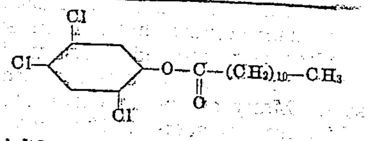

2,4,5-trichlorophenol (90 grams) in 300 cc. of benzene was reacted with 100 grams of lauroyl chloride, as described for the caproate, and worked up in the same manner. Vacuum distillation at 6 mm. yielded a fraction of 150 grams, boiling at 245° C.–250° C. and on redistillation, 134 grams of 2,4,5-trichlorophenyl laurate, boiling point, 233° C. were obtained. The liquid solidified rapidly to a crystalline product, melting point 60.4° C., C. P. 59.4° C.

The laurate, when tested as the formate was tested in accordance with Example I, also exhibited fungicidal properties.

The foregoing illustrates the practice of this invention, which however, is not to be limited thereby but is to be construed as broadly as permissible in view of the prior art and limited solely by the appended claims.

We claim:

1. Novel chemical compounds having the structural formula:

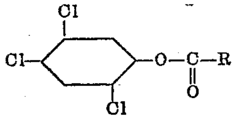

wherein R is a member selected from the group consisting of H and an alkyl radical containing not more than eleven carbon atoms.

2. The formate of 2,4,5-trichlorophenol.
3. The acetate of 2,4,5-trichlorophenol.
4. The propionate of 2,4,5-trichlorophenol.

ARTHUR R. CADE.
WILLIAM S. GUMP.

REFERENCES CITED

The following references are of record in the file of this patent:

Holleman et al., "Rec. trav. Chim.," vol. 39 (1920) page 738.

Auwers et al., "Ann. der Chem.," vol. 464 (1928) page 310.